Patented Mar. 4, 1952

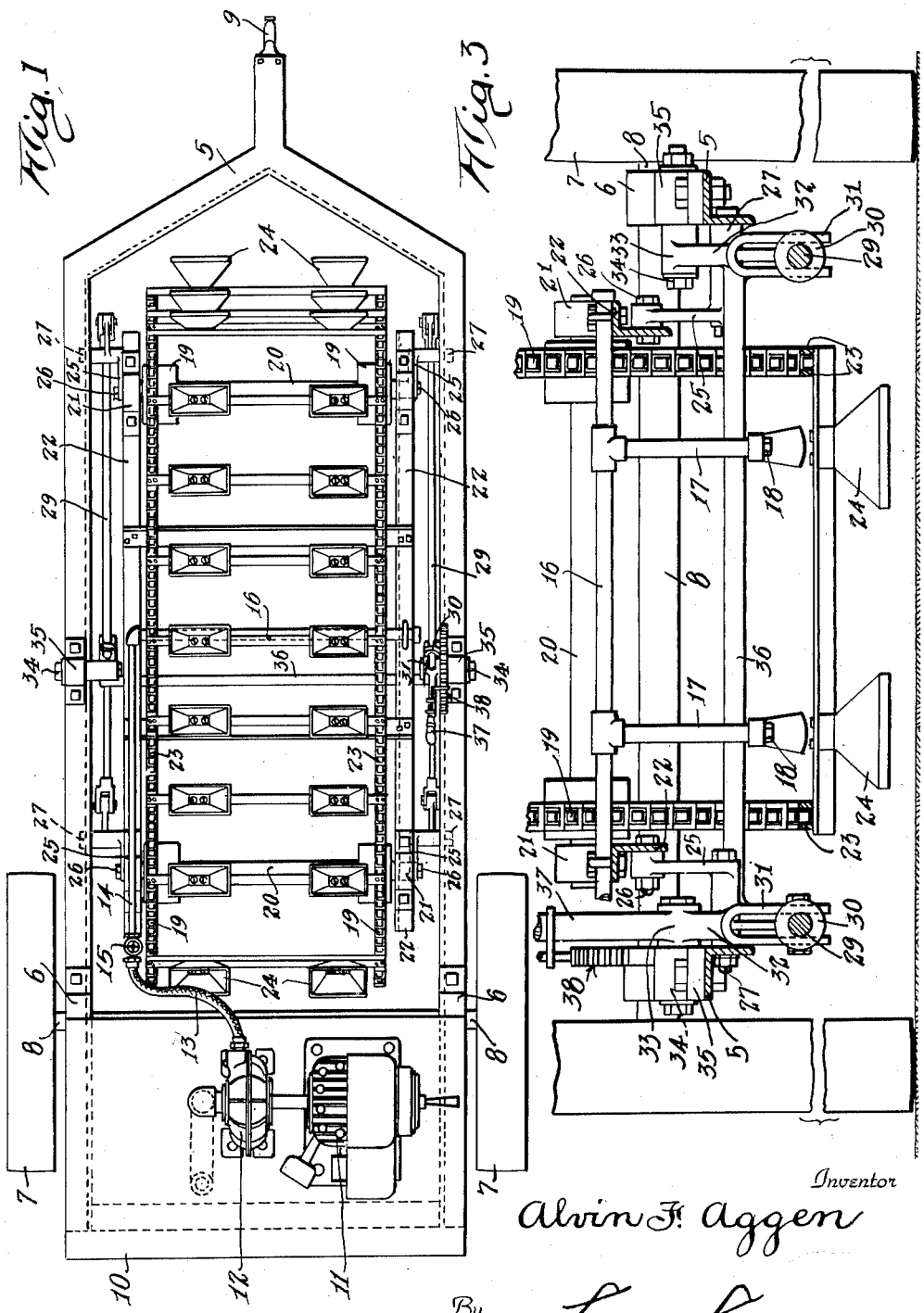

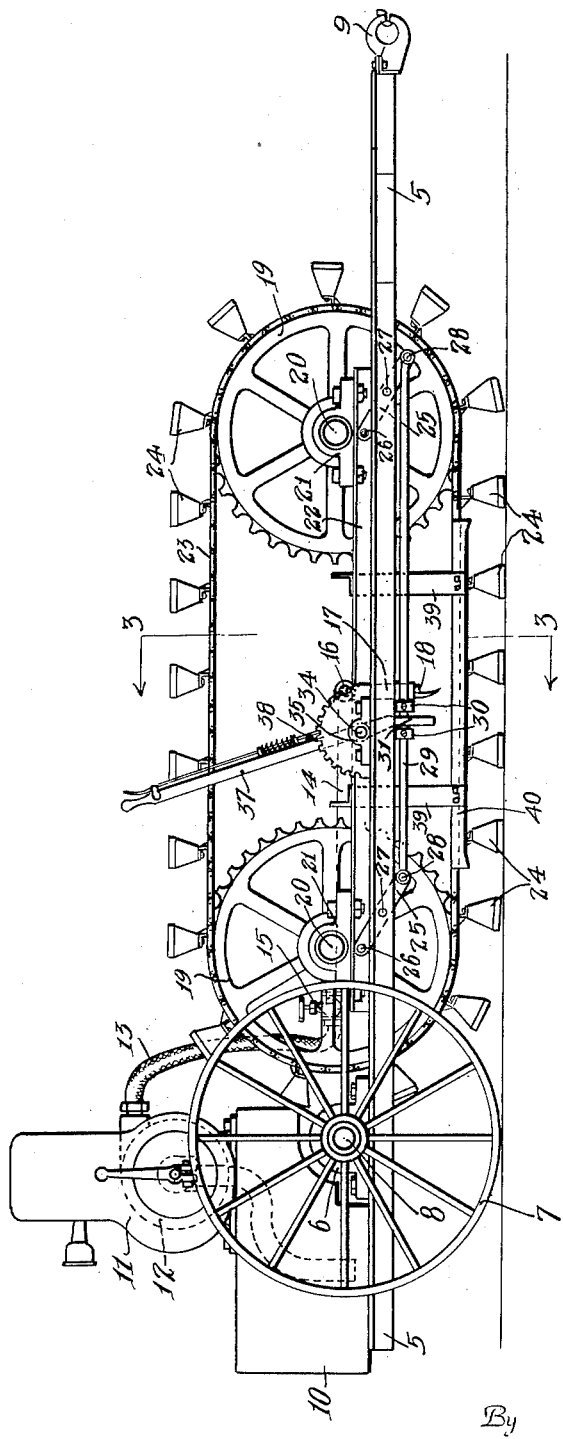

2,587,950

UNITED STATES PATENT OFFICE 2,587,950

APPARATUS FOR THINNING PLANTS AND KILLING EXTRANEOUS VEGETATION

Alvin F. Aggen, Camarillo, Calif.

Application April 30, 1945, Serial No. 591,160

7 Claims. (Cl. 97—22)

1

My invention relates to the art of plant thinning and weed exterminating, and more particularly to the art of thinning plants and killing weeds through the use of a fluid spray.

It is the practice in growing produce and the like to plant in long, straight rows. This entails dropping or placing seed into the ground along straight lines, whereby as the vegetation appears above the ground, it will follow said straight lines as planted. Because of the requirement that the plants as they grow receive certain minimum amounts of nourishment from the soil, it is necessary at one or another period during the growth of the plants to thin the same; that is, to destroy in each row certain of the plants, leaving the others to grow in spaced relation along the aforesaid rows.

Likewise, it is often found necessary to remove weeds and other extraneous vegetation from around and about the plants to be saved and from in between the aforesaid rows. It has been determined that a fine spray of crude oil or other plant-killing fluid will not only thin the rows, but will effectively kill such extraneous vegetation. To eradicate such vegetation while spraying the desired plants, however, has heretofore required considerable care on the part of one using such a spraying method. Large-scale spraying measures have not been adopted for the reason that to protect the desired plants, spraying must be done in small scale manner, and by an operator who points the spraying nozzle carefully away from the plants to be spared. This, of course, incurs great expense and loss of time.

It is my object to provide a method and means for achieving the above results by the general spraying of oil or similar fluid around and upon the plant rows, while the plants to be saved are covered and protected. This performs the twofold function of thinning the plant rows and removing extraneous vegetation such as weeds from thereabouts.

Other objects and advantages of this invention, it is believed, will be apparent from the following detailed description of a preferred embodiment thereof, as illustrated in the accompanying drawings:

Figure 1 represents a top plan view of my spraying unit.

Figure 2 shows a side elevation thereof.

Figure 3 shows on a large scale a partial section of my spraying unit taken along the line 3—3 in Figure 2, leaving out, for simplicity of

2 disclosure, certain features of my complete apparatus.

The drawings herein referred to provide one specific means for carrying out my invention. There being other apparatus which could be successfully utilized in my method, it is not my desire to be limited to the specifically described apparatus, but to be protected in the apparatus as shown, equivalents thereof and in my progressive method for thinning plants and killing extraneous vegetation.

My method comprises the progressing along the aforesaid rows of plants and the spraying during said progression of a fluid on and about said rows. Within the immediate area being sprayed, I cover the plants I desire to save. I am able in this manner to continuously spray from one end of a row, or rows, to the other, and without the necessity of careful avoidance of spraying the plants to be spared. By the use of this method, a field may be thinned out row by row in progressive and speedy fashion, all extraneous vegetation killed and the young plants to be saved protected.

The apparatus I have invented for use in the above described method comprises, as shown in Figure 1, a supporting frame 5 mounting bearings 6. Wheels 7 on axle 8 rotatively mounted in said bearings 6 allow said supporting frame 5 to be drawn by any mover attached to extension 9 on said frame 5. At the rear of my spraying unit on frame 5 is tank 10, which is adapted to carry the vegetation killing fluid. Motor 11 is secured to the top of said tank and drives pump 12, which forces fluid through flexible hose 13, into pipe 14 through valve 15 and into a second pipe 16, which is jointed to pipe 14. As shown in Figure 3, pipe 16 has jointed thereto and suspended therefrom vertical pipes 17 to which are affixed sprayers 18, which deliver a thin film or spray to the surface of the ground for the purpose of exterminating undesired vegetation and thinning out the plant rows.

I have provided a tractor system for protecting those plants in the rows which are desired spared. The tractor system comprises, as best shown in Figure 2, sprocket wheels 19 on axles 20, rotatively mounted in bearings 21, which are supported by frame members 22. Riding on said sprocket wheels 19 are endless chain belts 23, to which are affixed buckets 24. In operation, the buckets 24 co-act with the ground and give support to the tractor structure. In order that the frame 22 and the supported tractor structure will move along the plant rows with the spraying unit, I have provided a connecting system between said tractor structure and supporting frame 5. This system comprises the arms 25 connected pivotally at 26 to frame members 22, and connected pivotally at 27 to supporting frame 5. The ends 28 of said arms 25 connect pivotally to rods 29, which carry flanges 30, secured rigidly thereto. Abutting flanges 30 are fork members 31, which are the extremities of cranks 32, projecting from sleeves 33, which are pivotally mounted on shafts 34, said shafts 34 being supported on frame 5 by bearing members 35. Connecting cranks 32, each of said cranks being on opposite sides of my apparatus, is rod 36. Rod 36 gives operative unity to the opposite sides of my supporting structure, and causes cranks 32, forks 31 and the rods 29 to move as one. On one side of my apparatus is lever arm 37, which has thereon a well-known stop ratchet means 38. It is apparent then, from Figure 2, that when the lever arm 37 is pushed forward, the rods 29 move backward, causing arms 25 to rotate about point 27 on supporting frame 5 and lifting the entire tractor apparatus from the ground.

Also included in the structure, as shown in Figure 2, are hanger arms 39 which support guards 40 over chain belts 23 at their position nearest the ground. The hanger arms 39 are rigidly suspended from frame members 22.

I have shown my apparatus to be comprised of two endless chains with two rows of cups supported thereby. It is obvious that my invention may include a greater number of said cups or of said endless chains, depending upon the number of rows desired sprayed in the course of a single progression across the field. It is also apparent that depending upon the amount of thinning desired, the protective cups 24 might be mounted in greater or lesser spaced relation along the endless chains.

In the operation of my apparatus the complete unit is started at one end of the rows in a field to be sprayed. The apparatus is placed over said row in such manner that the cups 24 of each of my endless chains will co-act with a row. The lever 37 is released and allowed to move backward whereby the tractor system settles upon the ground, the cups 24 each covering a plant. Spraying is then started and the entire apparatus drawn along the rows. As the supporting frame 5 progresses on wheels 7, it is apparent that the endless cup bearing chains 23 will be caused to rotate about the sprocket wheels 19, so that those cups 24 covering plants are caused to remain motionless with respect to the ground and thus protect the plants. This tractor action is brought about by the friction of said cups with the ground. When the end of the rows is reached, to facilitate turning and the commencement of a spraying operation in the opposite direction over adjacent rows, the valve 15 may be turned off, thus stopping the spraying. Lever 37 is then moved forward, causing arms 25 to rotate in clockwise direction and lift the tractor structure from the ground. In this manner the entire apparatus may be sharply turned and the spraying operation commenced, as described, upon the other rows.

Having fully described my invention, it is to be understood that I do not wish to be limited to the details herein set forth, but my invention is of the full scope of the appended claims.

I claim:

1. An apparatus for thinning a continuous row of growing plants and for killing extraneous vegetation thereabout, comprising: a carriage adapted to be drawn along plant rows; spraying means on said carriage; sprocket wheels rotatively mounted with respect to said carriage; endless chains connecting said sprocket wheels; and spaced inverted cups mounted on said endless chains supporting said sprocket wheels and adapted to progressively co-act with the ground and progressively cover said plants as said carriage is drawn forward.

2. An apparatus for thinning a continuous row of growing plants and killing extraneous vegetation about plants comprising: a carriage; spraying means on said carriage; an endless belt means suspended from said carriage, said means comprising a frame carried by said carriage, sprocket wheels rotatively mounted in said frame, chains mounted on said sprocket wheels, and cups mounted in spaced relation on said chains.

3. In an apparatus as defined in claim 2: said endless belt means suspended from said carriage so that the lowermost of said cups rest upon the ground, forming a closed protective covering for said plants adjacent said sprayers and supporting said endless belt means.

4. An apparatus for thinning out continuous rows of plants and killing extraneous vegetation thereabout, comprising: a carriage; spraying means on said carriage; endless belt means suspended from said carriage; cups on said endless belt means adapted to cover said plants by pressing into the ground immediately surrounding said plants and supporting said endless belt means; and means adapted to raise said endless belt means and said covers from said ground, said means comprising arms rotatively mounted to said carriage and pivotally connected to said endless belt means, which when rotated will raise said endless belt means with respect to said carriage, rods pivotally connected to the ends of said arms, and crank means operatively connected to said rods whereby said rods may cause said arms to pivot.

5. An apparatus for thinning out a continuous row of plants and killing extraneous vegetation thereabout, comprising: a frame; sprocket wheels rotatively mounted in said frame; a chain trained about said sprocket wheels; and inverted cups mounted in spaced relation on said chain adapted to co-act with the ground to protect said plants and support said apparatus, and spray means carried by the frame including a nozzle adapted to direct a plant killing substance onto the row.

6. Apparatus for thinning a continuous row of growing plants and killing extraneous vegetation thereabout, comprising in combination a mobile frame adapted to move along the row, a rotary member having a series of ground-contacting inverted cups mounted thereon, the cups being adapted to cover spaced portions of the row as the rotary member turns, and spray means carried by the frame including a nozzle positioned directly over the row adapted to spray substantially vertically downwardly onto said inverted cups.

7. Apparatus for thinning a continuous row of growing plants and killing extraneous vegetation thereabout, comprising in combination a mobile frame adapted to move along the row, spaced rotary elements carried by the frame, an endless flexible member trained over said rotary elements, a series of ground-contacting inverted cups on the flexible member adapted to cover spaced portions of the row, and spray means carried by the frame including a nozzle adapted to spray the covers and the uncovered portions of the row.

ALVIN F. AGGEN.

REFERENCES CITED

The following references are of record in the file of this patent:

UNITED STATES PATENTS

| Number | Name | Date |
|---|---|---|
| 439,176 | Pace | Oct. 28, 1890 |
| 1,088,969 | Cox | Mar. 3, 1914 |
| 1,204,799 | Luce | Nov. 14, 1916 |
| 1,234,002 | Forrest | July 17, 1917 |
| 1,544,990 | Johnson | July 7, 1925 |
| 1,723,502 | Clark | Aug. 6, 1929 |
| 1,882,377 | Whittelsey | Oct. 11, 1932 |

FOREIGN PATENTS

| Number | Country | Date |
|---|---|---|
| 16,833 | Denmark | Dec. 23, 1912 |
| 689,910 | France | June 3, 1930 |
| 1,074 | Great Britain | of 1862 |